United States Patent [19]
Inada et al.

[11] Patent Number: 4,924,710
[45] Date of Patent: May 15, 1990

[54] VORTEX FLOWMETER

[75] Inventors: Yutaka Inada, Tokyo; Kazumasa Kawasaki, Kanagawa; Shigeru Nishiyama, Kanagawa; Hiroshi Yoshikura, Kanagawa, all of Japan

[73] Assignee: Tokico Ltd., Kanagawa, Japan

[21] Appl. No.: 354,222

[22] Filed: May 19, 1989

[30] Foreign Application Priority Data

May 20, 1988 [JP] Japan ................... 63-123060

[51] Int. Cl.⁵ .............................................. G01F 1/32
[52] U.S. Cl. .................................................. 73/861.23
[58] Field of Search ....................... 73/861.23, 861.22

[56] References Cited

U.S. PATENT DOCUMENTS 3,886,794 6/1975 McShane .

FOREIGN PATENT DOCUMENTS 0121780 9/1979 Japan .
57-25141 5/1982 Japan .
58-32333 7/1983 Japan .
64-78114 3/1989 Japan .

Primary Examiner—Herbert Goldstein
Attorney, Agent, or Firm—Wenderoth, Lind & Ponack

[57] ABSTRACT

A vortex flowmeter comprising ultrasonic wave transmitters and ultrasonic wave receivers adapted to receive ultrasonic waves transmitted by the transmitters through a flow of fluid in which vortices are generated by a vortex generator, the ultrasonic wave signals output by the ultrasonic wave receivers being compared by a phase comparator to measure the flow rate of the fluid by detecting the difference in phase of the ultrasonic waves due to generation of the vortices. First and second ultrasonic wave transmitters are disposed on the wall of a pipe line defining the flow path for the fluid downstream of the vortex generator and first and second ultrasonic wave receivers are respectively disposed at positions on the wall of the pipe line opposite to the first and second transmitters and in such a manner that the first propagation route for the ultrasonic waves propagating from the first ultrasonic wave transmitter to the first ultrasonic wave receiver and the second propagation route for ultrasonic waves propagating from the second ultrasonic wave transmitter to the second ultrasonic wave receiver intersect each other and extend in opposite directions. The phase of the respective ultrasonic wave signals output by the first and second ultrasonic wave receivers are compared by a phase comparator so that the vortices generated by the vortex generator can be detected.

1 Claim, 5 Drawing Sheets

VORTEX FLOWMETER

TECHNICAL FIELD

The present invention relates to a vortex flowmeter and more specifically to a vortex flowmeter adapted to detect the phase modulation of ultrasonic waves propagated in a fluid caused by Karman's vortices generated in the fluid by a vortex generator and to measure the flow rate of the fluid by detecting the generation of the Karman's vortices.

BACKGROUND OF THE INVENTION

Examples of vortex flowmeters according to a prior art are disclosed in Japanese Utility Model Publication No. SHO-57-25141 and Japanese Patent Publication No. SHO-58-32333, in which a vortex generator is provided in a fluid and the flow rate is measured by detecting the number of Karman's vortices generated on the downstream side of the vortex generator by utilizing ultrasonic waves.

FIG. 6 illustrates the constitution of a vortex flowmeter of a well known type. In FIG. 6, ultrasonic waves which have been generated by the oscillator 1 and transmitted into the fluid by the ultrasonic wave transmitter 2a are caused to propagate in the direction perpendicular to the direction of the flow of fluid as well as along a passage parallel to the plane of the drawing and are detected by the ultrasonic wave receiver 2b. The output signals from the ultrasonic wave receiver 2b are supplied as α signals to the phase comparator 4 through the phase controller 3. On the other hand, the oscillation signals which have been branched off from the output of the oscillator 1 separately from ultrasonic waves which pass through the fluid are supplied as β signals to the other input terminal of the phase comparator 4 through the phase controller 5.

The phases of the two kinds of signals, α and β, are compared by the phase comparator 4. In this instance, the ultrasonic α wave signals which have passed through the fluid in which no Karman's vortices are generated possess a certain constant difference in phase relative to the original β oscillation signals.

In FIG. 6, when the fluid the flow rate of which is to be detected flows vertically downward in the pipe line 6 shown in the drawing, regular vortices, or the so-called Karman's vortices are alternately generated in the fluid to the left and right on the downstream side of a well-known vortex generator 7 disposed in the pipe line 6.

In this case, upon propagation in the fluid of the ultrasonic waves passing through the fluid, and when the ultrasonic waves encounter the Karman's vortices generated by the vortex generator 7, the ultrasonic waves will be subjected to phase modulation by the flow rate component in the lateral direction of the Karman's vortices (or the direction parallel to the plane of the drawing and the direction of propagation of the ultrasonic waves). Accordingly, the two kinds of signals, α and β, supplied to the phase comparator 4 exhibit a phase difference which is different from the constant phase difference obtained when ultrasonic waves passing through the fluid do not encounter any Karman's vortex. If this change in the phase difference is detected and output from the output terminal 8a through the filter 8, the number of Karman's vortices which have been generated in proportion to the flow rate may be detected and thus the flow rate of the fluid to be measured may be measured.

It is to be noted, however, that the phase of the ultrasonic waves which are propagated through the fluid will also be caused to change by external phenomena such as a change in temperature of the fluid, etc., apart from any Karman's vortex. It is therefore possible that the difference between the phases of two signals supplied to the phase comparator 4 may deviate from the linear operational range of the phase comparator due to a change in phase caused by such external phenomenon as a temperature change or the like.

In order to prevent this deviation, any change in the phase due to external phenomena is firstly extracted by the filter 8 and the output so processed is supplied to the phase controllers 3 and 5 so that the difference in phases between two ultrasonic waves supplied to the phase comparator 4 may be controlled to ensure that it is included in the linear operational range of the phase comparator 4. As a consequence, even if the phases of ultrasonic waves vary considerably due to such external phenomena as temperature changes, etc., such variation in the phases can be coped with.

With a vortex flowmeter of prior art as explained above, if it is desired to prevent deviation of the difference in the phases of two ultrasonic waves supplied to the phase comparator 4 beyond the linear operational range of the phase comparator 4 due to external phenomena such as changes in fluid temperature and the like, the circuits of the phase controllers 3, 5 would have to be extremely complicated. Moreover, since the S/N ratio of the ultrasonic wave signals for detecting generation of Karman's vortices must be low in a flow having a low Reynold's number, the gain of the amplifier adapted to amplify the frequency and signals of the ultrasonic waves have to be increased, leading to an increase in the consumption of electric power as well.

It is also to be noted that if inexpensive phase controllers 3, 5 are to be employed, such controllers are limited in their ability to accommodate variations in phases and this will mean that the relative vortex flowmeter explained above is unable to work when the extent of variations in the phases due to external phenomena as explained exceeds a given range of tolerance.

In view of the problems pointed out above, the applicant of the present invention proposed a vortex flowmeter as shown in FIG. 7 as the subject of Japanese Published patent application Ser. No. Sho-64-78114, wherein first and second ultrasonic wave transmitters 9a', 10a' which constitute the ultrasonic wave transmitter of this vortex flowmeter are disposed on the wall of the pipe line downstream of the vortex generator and the first and second ultrasonic wave receivers 9b', 10b' which constitute the ultrasonic wave receiver of this vortex flowmeter are disposed on the wall of the pipe line respectively facing the first and second ultrasonic wave transmitters 9a', 10a', the first ultrasonic wave propagation route from the first ultrasonic wave transmitter 9a' to the first ultrasonic wave receiver 9b' and the second ultrasonic wave propagation route from the second ultrasonic wave transmitter 10a' to the second ultrasonic receiver 10b' being disposed parallel to each other but directed in opposite directions, the first and second ultrasonic wave transmitters 9a', 10a' and the first and second ultrasonic wave receivers 9b', 10b' being provided such that the first and second ultrasonic wave propagation routes are caused to simultaneously cross the vortices continuously generated by the vortex generator, and the phases of the respective ultrasonic wave signals output from the first and second ultrasonic wave receivers 9b', 10b' being compared by the phase comparator 11 which allows the vortices continuously generated by the vortex generator to be detected.

However in the arrangement in which the first and second ultrasonic wave generation routes are disposed parallel to each other, if the ultrasonic wave transmitters 9a', 10a' as well as the ultrasonic wave receivers 9b', 10b' are attached to the outer wall surface of the pipe line 6 by means of clamping, refraction of the ultrasonic wave to be propagated is likely to occur at the barrier of the propagation media in the ultrasonic wave propagation route from the ultrasonic wave transmitter 9a' to the ultrasonic wave receiver 9b', as shown in FIG. 8. For this reason, the ultrasonic wave transmitter and the ultrasonic wave receiver have to be so mounted that the ultrasonic wave can be made incident on the propagation media in an inclined fashion, and the incident angle relative to the respective border of the propagation media may thus vary due to temperature changes or the like, making it impossible to reliably transmit and receive ultrasonic waves.

Further in the arrangement where the mounting holes are drilled through the wall of the pipe line so that the ultrasonic wave transmitter and the ultrasonic wave receiver are mounted by insertion in the holes, the tip end portions of the ultrasonic wave transmitters 9a', 10a' and the ultrasonic wave receivers 9b', 10b' are attached to the mounting holes leaving at least partly uneven portions relative to the inner wall surface of the pipe line. Thus creation of uneven portions which are not necessary on the inner wall surface means that the flow rate of the fluid flowing adjacent to the inner wall may vary when passing over the uneven portion of the mounting hole. Accordingly it is preferable that there are no such recessed portions in a vortex flowmeter which may cause disturbance of the fluid as it passes over the inner wall of the pipe line. It is also important that the tip end portions of the respective ultrasonic wave transmitters 9a', 10a' and ultrasonic wave receivers 9b', 10b' are identical in configuration to the inner wall surface of the pipe line 6 if at all possible.

It is therefore the object of the present invention to provide a vortex flowmeter which solves the above-described problems and yet complies with the requirements described above.

SUMMARY OF THE INVENTION

The vortex flowmeter of the present invention has such a constitution that the first and second ultrasonic wave transmitters which constitute the ultrasonic wave transmitter of this vortex flowmeter are disposed on the wall of the pipe line downstream of a vortex generator while the first and second ultrasonic wave receivers which constitute the ultrasonic wave receiver of this vortex flowmeter are respectively disposed on the wall of the pipe line respectively facing the first and second ultrasonic wave transmitters, the first ultrasonic wave propagation route from the first ultrasonic wave transmitter to the first ultrasonic wave receiver and the second ultrasonic wave propagation route from the second ultrasonic wave transmitter to the second ultrasonic wave receiver being disposed in such a manner as to cross each other and propagate in the opposite direction, and the phases of the ultrasonic wave signals respectively output from the first and second ultrasonic wave receivers being compared by the phase comparator whereby the vortices generated by the vortex generator may be detected.

A change in the phases of ultrasonic waves caused by external phenomena such as a change in temperature, etc. will also similarly affect the phases of two ultrasonic waves propagating through the same fluid. For example, if such a phenomenon occurs in such a manner that the phase of one ultrasonic wave is caused to gain due to a change in temperature or the like, the phase of the other ultrasonic wave which propagates in the reverse direction will also be caused to gain.

On the other hand, the lateral component of the Karman's vortex will give a reverse effect to the phases of two ultrasonic waves propagating under a condition in which the ultrasonic wave propagation routes are disposed such as to cross each other and extend in opposite directions, and in which the Karman's vortices simultaneously cross the two propagation routes.

More specifically, if the phase of one ultrasonic wave is caused to gain due to Karman's vortex, the phase of the other ultrasonic wave will necessarily be delayed.

Accordingly, when the phases of the two ultrasonic wave signals are compared by the phase comparator, a change in phase caused by external phenomena such as a change in temperature or the like will be offset, and the change in phase of the two ultrasonic waves caused by the Karman's vortices will predominate.

It is further noted that the first and second ultrasonic wave transmitters and the first and second ultrasonic wave receivers need not be attached to the wall of the pipe line so as to allow the ultrasonic waves to be incident in an inclined fashion, and that attachment of the transmitters and receivers to the wall of the pipe line will not disturb the flow of fluid therein.

DESCRIPTION OF EMBODIMENTS

Figure 1:
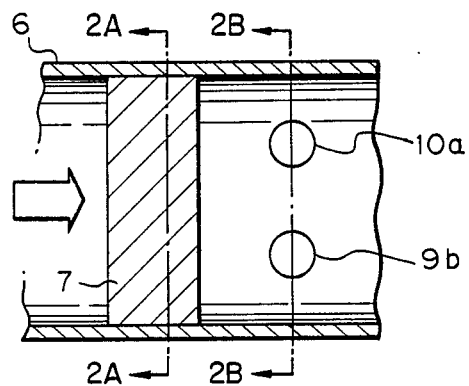
FIG. 1 is a side sectional view showing an embodiment of the present invention.

FIG. 1 is a side sectional view of a vortex flowmeter according to an embodiment of the present invention showing the interior of the pipe line 6. As seen in FIG. 1, when the fluid flows from left to right in the pipe line 6, Karman's vortex will be generated by the vortex generator downstream thereof.

Figure 2A:
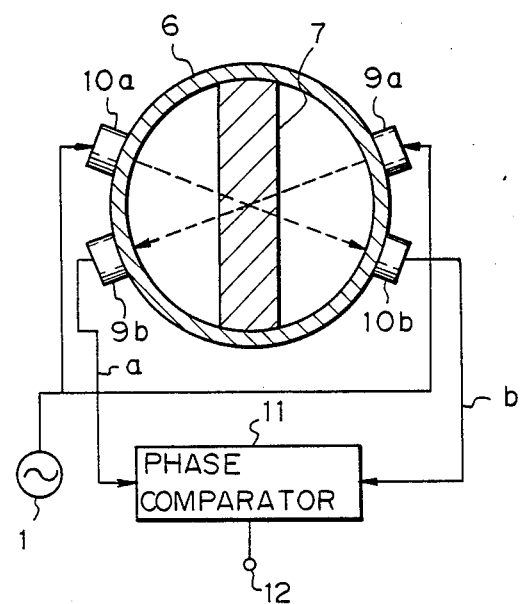
FIG. 2(A) is a block diagram which illustrates a principle circuit not included in the side sectional view of FIG. 1.

FIG. 2(A) is a sectional view taken along the lines 2A–2A in FIG. 1 and collectively illustrates the oscillator 1 serving as the source of ultrasonic waves, ultrasonic wave transmitters 9a, 10a, ultrasonic wave receivers 9b, 10b respectively adapted to receive ultrasonic waves, and phase comparator 11. In FIG. 2(A), the fluid is understood to flow vertically relative to the plane of the drawing from the front to the rear.

Figure 2B:
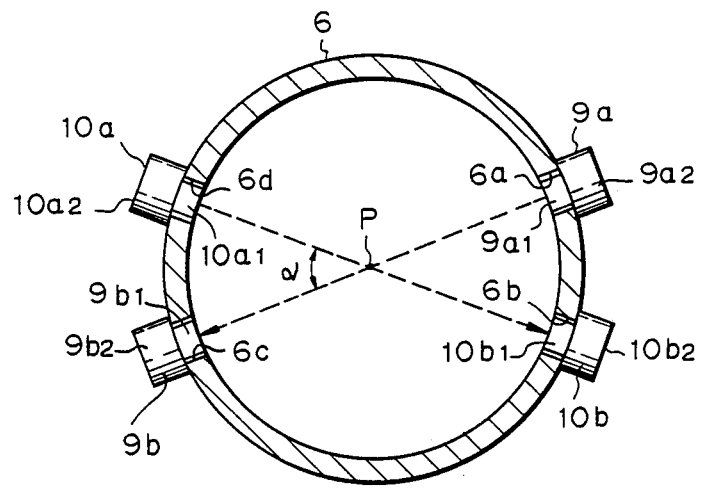
FIG. 2(B) is a vertical sectional view taken along the line 2B-2B in FIG. 1.

In FIG. 2(B) are shown ultrasonic wave transmitters 9a, 10a and ultrasonic wave receivers 9b, 10b which are inserted in and secured to two pairs of mounting holes 6a, 6b, 6c and 6d in the pipe line 6. The respective mounting holes 6a–6d are drilled through the pipe line 6 toward the center of its cross section. It is to be observed that the mounting holes 6a and 6c are provided at positions on the same straight line while the mounting holes 6b and 6d are provided at positions on another straight line. The mounting holes 6a and 6c of one set are drilled toward the axis P at an angle $\alpha$ relative to the mounting holes 6b and 6d of another set.

The tip end portions $9a_1$, $9b_1$, $10a_1$ and $10b_1$ of the respective ultrasonic wave transmitters 9a, 10a and the respective ultrasonic wave receivers 9b, 10b are inserted through the mounting holes 6a, 6d, 6b and 6c and the larger diameter portions $9a_2$, $9b_2$, $10a_2$ and $10b_2$ which project from the outer circumference of the pipe line 6 are fixedly mounted to the outer circumference of the pipe line 6 by means of mounting bolts (not shown). Since the tip end portions $9a_2$, $10a_1$, $9b_1$ and $10b_1$ of the ultrasonic wave transmitters 9a, 10a and the ultrasonic wave receivers 9b, 10b are in contact with the fluid flowing through the pipe line 6 and are caused to oscillate thereby, they have a somewhat smaller diameter than those of the respective mounting holes 6a–6d, and the tip end portions $9a_1$, $10a_1$, $9b_1$ and $10b_1$ have a loosely fitting relationship with the respective mounting holes 6a–6d.

Since the mounting holes 6a–6d are respectively drilled through the pipe line 6 toward the axis P of the pipe line 6, the respective ultrasonic wave transmitters 9a, 10a and the ultrasonic wave receivers 9b, 10b are disposed to face each other with the axis P therebetween. Accordingly, the ultrasonic waves which are transmitted from the respective ultrasonic wave transmitters 9a, 10a are detected by the ultrasonic receivers 9b, 10b, crossing the axis P.

It is further to be noted that since the respective ultrasonic wave transmitters 9a, 10a and the ultrasonic wave receivers 9b, 10b are disposed to face each other toward the axis P of the pipe line 6, the end surfaces of the tip end portions $9a_1$, $10a_1$, $9b_1$ and $10b_1$ may be so constructed as to ensure that they do not project from the inner wall of the pipe line 6 to any substantial extent. More specifically the end surfaces of the tip end portions $9a_1$, $10a_1$, $9b_1$ and $10b_1$ may be substantially flush with the recessed inner wall of the pipe line 6.

Consequently, the fluid may flow through the pipe line 6 with minimal influence from the respective ultrasonic wave transmitters 9a, 10a, the respective ultrasonic wave receivers 9b, 10b and their mounting holes 6a–6d. Accordingly, the influence on generation of Karman's vortex may be reduced, and the measurement accuracy of the vortex flowmeter may thus be further enhanced.

Figure 3:
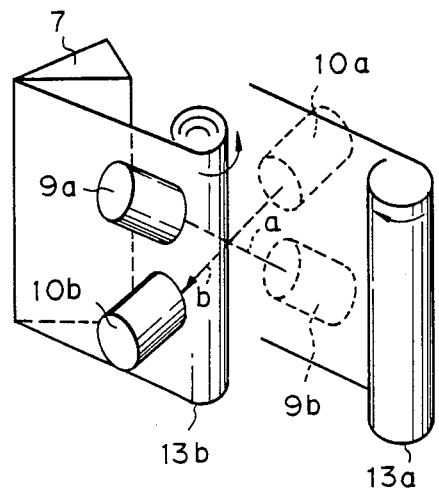
FIG. 3 is a schematic view showing the relationships among the vortex generator, Karman's vortex and the ultrasonic wave transmitter and receiver.

FIG. 3 is a model perspective view illustrating the positional relationship between the Karman's vortex generated in the fluid by the vortex generator 7, the ultrasonic transmitters 9a, 10a and the ultrasonic wave receivers 9b, 10b. In FIG. 3, the dotted arrows show the direction of propagation of the ultrasonic waves. As seen from FIG. 3, the two ultrasonic waves propagate in opposite directions and intersect at the axis P. It can also be seen from FIG. 3 that the Karman's vortex 13a has already passed the propagation route for two ultrasonic waves transmitted from the ultrasonic wave transmitters 9a, 10a and the next Karman's vortex 13b is about to come into the propagation route for the two ultrasonic waves.

Figure 4:
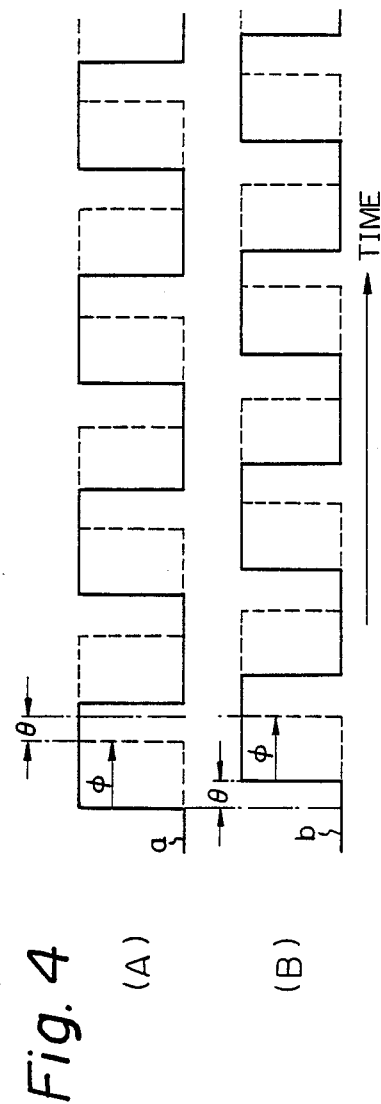
FIGS. 4A and 4B are a wave form diagram showing the relationship of the phases of two ultrasonic waves.

FIG. 4(A) and FIG. 4(B) illustrate the wave forms of two pulsed ultrasonic wave signals and the relationship between their phases when Karman's vortices pass through the two ultrasonic wave propagation routes as shown in FIG. 3. As seen from FIG. 3, the ultrasonic waves a which are transmitted from the ultrasonic wave transmitter 9a experience a gain in phase since the Karman's vortex 13b has a component oriented in the same direction as the ultrasonic waves a, while the ultrasonic waves b which are transmitted from the ultrasonic wave transmitter 10a undergo a delay in phase since these waves b proceed in the direction opposite to the lateral component of the Karman's vortex 13b.

As the Karman's vortex 13b proceeds in the downstream direction from the state shown in FIG. 3, the rate of gain in the phase of the ultrasonic waves a and the rate of delay in the phase of the ultrasonic waves b will decrease, whereby when the center of the Karman's vortex passes through the two ultrasonic propagation routes, the gain in phase of the ultrasonic waves a and the delay in phase of the ultrasonic waves b will both be nil. Subsequently when the latter half of the Karman's vortex passes through the two ultrasonic wave propagation routes, the phase of the ultrasonic waves a will, in contrast, be delayed while the phase of the ultrasonic waves b will gain. In this way, when one of the Karman's vortices pass through the ultrasonic wave propagation route, the difference in phases of the ultrasonic waves a, b will be changed at the rate of half the cycle of the sinusoidal wave. By detecting the change in the difference in phase between these ultrasonic waves a, b, generation of Karman's vortex may be detected, and by counting the number of Karman's vortices in a given unit of time, the flow rate of the fluid can be measured.

Figure 5:
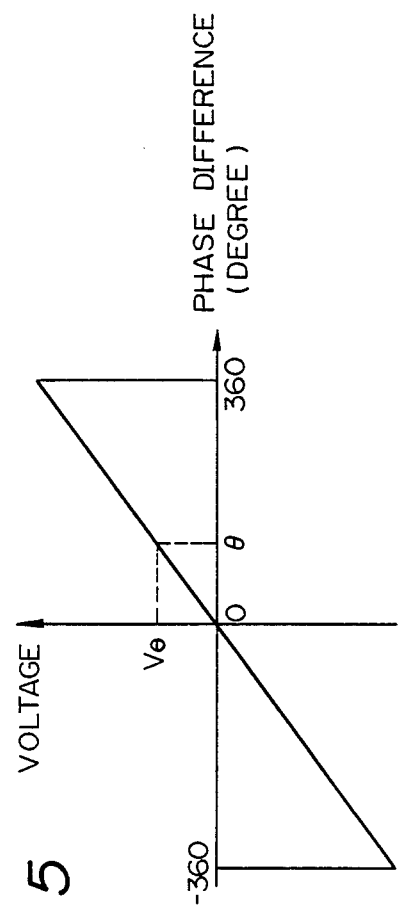
FIG. 5 is a characteristic diagram of the phase difference and the voltage at the time when the difference in phases of two ultrasonic waves is converted to a voltage.
Figure 6:
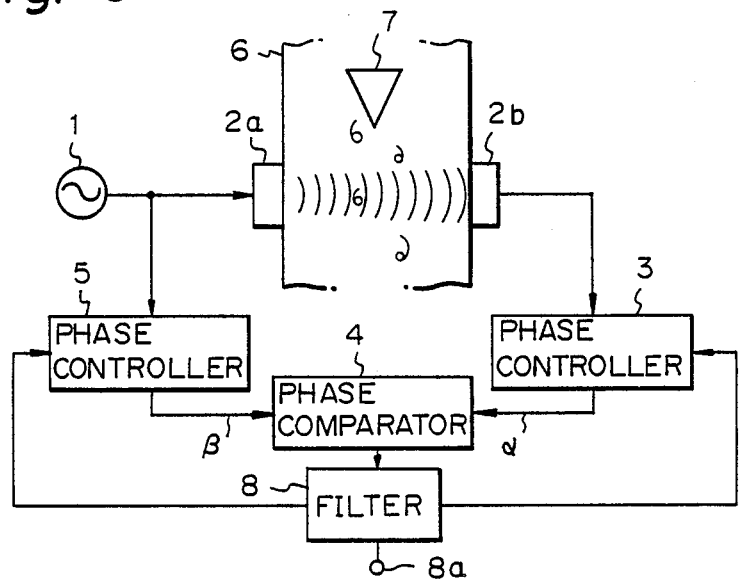
FIG. 6 is a block diagram showing an example of the vortex flowmeter according to prior art.
Figure 7:
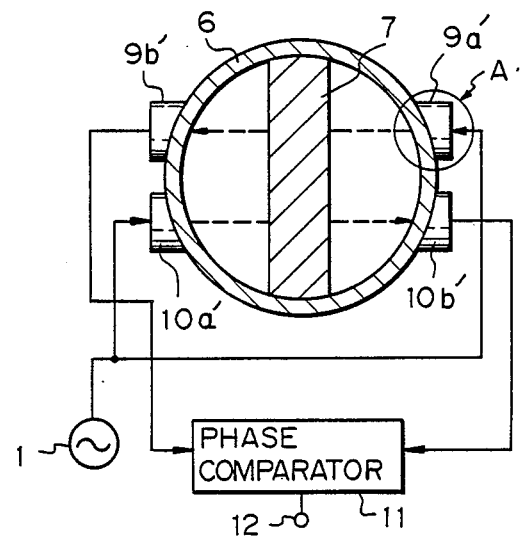
FIG. 7 is a block diagram showing a vortex flowmeter according to prior art.
Figure 8:
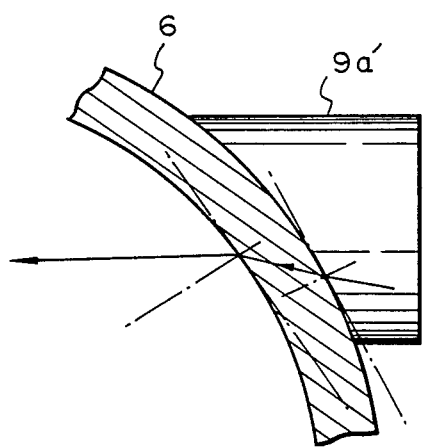
FIG. 8 is an enlarged sectional view of the portion "A" in FIG. 7 which is used to explain the incident angle of the ultrasonic waves caused in a vortex flowmeter according to prior art.

When the difference in the phases of two ultrasonic wave signals a and b becomes $\theta$, the phase comparator 11 will output a voltage $V_\theta$ corresponding to the difference in phase $\theta$. FIG. 5 is a graph showing the relationship between the difference in phase of two ultrasonic wave signals a, b and the output voltage from the phase comparator 11. As shown in FIG. 5, the voltage output by the phase comparator 11 may change linearly within the range of the difference in phase of the two ultrasonic waves a, b, i.e. from $-360$ degree to 360 degree.

When the temperature of the fluid the flow rate of which is to be measured is changed, the phases of the ultrasonic waves which propagate through the fluid will change correspondingly. However, external phenomena such as changes in temperature, etc. may have the same influence on two different ways of propagating ultrasonic waves. More specifically, if a certain phenomenon occurs which could delay the phase of one ultrasonic wave, the phase of the other ultrasonic wave which is propagating in the opposite direction will accordingly be delayed.

The wave forms respectively shown by dotted lines in FIG. 4(A) and FIG. 4(B) illustrate the manner in which the phases of the ultrasonic waves shown in solid lines are delayed due to external phenomena such as changes in temperature, etc. In this case, if the phase of the wave form a shown in FIG. 4(A) is delayed by the amount $\phi$, the phase of the wave form b shown in FIG. 4(B) will be correspondingly delayed by the amount $\phi$ and the relative difference $\theta$ between the phases of the two wave forms a, b remains substantially unaffected even if external phenomena such as changes in temperature occur. Accordingly in the phase comparator 11, the phases of the two signals a, b are compared and this makes it possible to solely detect the change in phase that is purely due to Karman's vortex. It is also to be noted that, since the phases of the two ultrasonic waves are detected in such a manner that the changes are superimposed upon each other, Karman's vortex may be detected with higher sensitivity than the prior art devices in which only one ultrasonic wave transmitter and one ultrasonic wave receiver are employed.

It will also be understood that, although in the embodiment described above the holes are provided in the wall of the pipe line so that the ultrasonic wave transmitters and the ultrasonic wave receivers are mounted to directly face the flow passage in the pipe line, the manner of mounting these transmitters and receivers to the wall of the pipe line is not limited to what is described above; the ultrasonic wave transmitters and the ultrasonic wave receivers may alternatively be mounted to the wall of the pipe line by means of clamping without directly facing the flow passage.

It is also to be noted that, although in the embodiment described above the propagation routes of two ultrasonic waves disposed in the fluid to be measured intersect each other and the Karman's vortices cross the two propagation routes of the ultrasonic waves substantially simultaneously, the present invention is not limited to this embodiment. Instead, if the construction has to be such that the Karman's vortices will cross the two propagation routes of the ultrasonic waves one after another with a given interval therebetween (for example, in FIG. 1, the ultrasonic wave transmitter 10a and the ultrasonic wave receiver 10b could be moved downstream a few millimeters while the ultrasonic wave transmitter 9a and the ultrasonic wave receiver 9b are left as they are) due to certain design limitations, effects similar to those obtained in the embodiment described above may be attained provided that certain means to compensate for the time interval, such as a delay in the ultrasonic wave signals, are provided.

According to the present invention and as described above, it becomes possible to eliminate any change in phase of ultrasonic waves due to external causes such as changes in temperature, vibration of a pipe line or pump, etc. by means of a simple constitution without requiring complicated circuits such as phase controllers, etc. and thus to detect Karman's vortices with an extremely high sensitivity compared to a vortex flowmeter of prior art. According to the present invention, therefore, it becomes possible to reduce the frequency of the ultrasonic waves and the gain of the output amplifier and to further simplify the circuit constitution, as well as to reduce the power consumption and running costs.

It is also possible according to the present invention to further simplify the mounting of the first and second ultrasonic wave transmitters and the first and second ultrasonic wave receivers to the pipe line for they need not be mounted in an inclined fashion relative to the wall of the pipe line. It is also possible to execute measurements reliably, for the manner of mounting in accordance with the present invention serves to minimize any influence over the fluid flowing through the pipe line.

It is also possible according to the present invention to detect the strongest and most stable vortices generated adjacent to the center of the pipe line, because the first and second ultrasonic wave propagation routes which cross the vortex will not be spaced apart vertically and the vortices are able to pass through the central part of the sectional plane of the flow path.

Having described the vortex flowmeter according to the present invention, it will be apparent to those skilled in the art that many changes can be made without departing from the spirit and scope of the present invention. Thus the scope of the present invention should not be limited to the examples described in this application.

What is claimed is:

1. A vortex flowmeter comprising a ultrasonic wave transmitter and a ultrasonic wave receiver disposed to face each other on sides of a flow path defined by the wall of a pipe line which serve to cause ultrasonic waves transmitted by the ultrasonic wave transmitter to be propagated into the flow of fluid through the pipe line and to be received by said ultrasonic wave receiver, and adapted to measure the flow rate of said fluid by detecting any change in the phase of the ultrasonic waves due to generation of vortices by a vortex generator provided in said pipe line from the ultrasonic wave signals output from said ultrasonic wave receiver, said vortex flowmeter being characterized in that, first and second ultrasonic wave transmitters which constitute said ultrasonic wave transmitter are disposed on the wall of said pipe line downstream of said vortex generator, first and second ultrasonic wave receivers which constitute said ultrasonic wave receiver are respectively disposed at position on the wall of said pipe line opposite to said first and second ultrasonic wave transmitters and in such a manner that the first propagation route for the ultrasonic waves propagating from said first ultrasonic wave transmitter to said first ultrasonic wave receiver and the second propagation route for ultrasonic waves propagating from said second ultrasonic wave transmitter to said second ultrasonic wave receiver intersect each other and extend in opposite directions, and the phases of the respective ultrasonic wave signals output from said first and second ultrasonic wave receivers are compared by a phase comparator so that the vortices generated by said vortex generator can be detected.

* * * * *